J. H. Soule.
Milk-Stirrer.
N° 76260 — Patented Mar. 31, 1868.
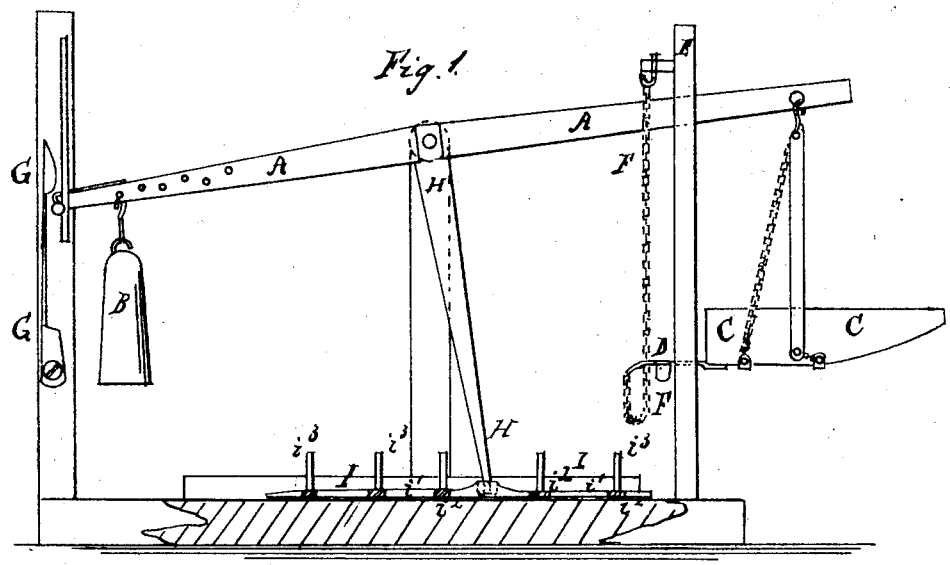
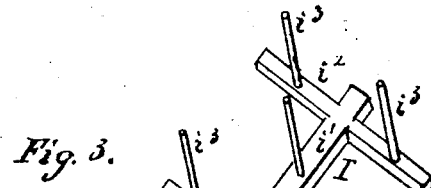
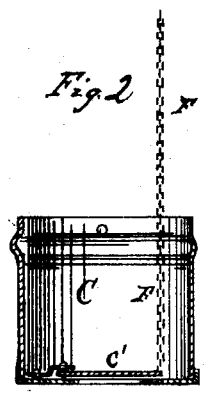
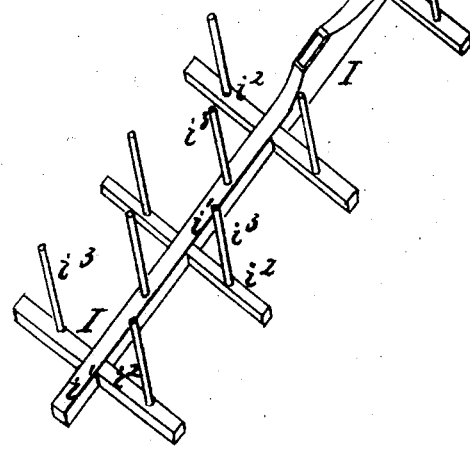
Witnesses.
Inventor.

United States Patent Office.

JOEL H. SOULE, OF GEORGETOWN, NEW YORK.

Letters Patent No. 76,260, dated March 31, 1868.

IMPROVEMENT IN MILK-STIRRERS.

*The Schedule referred to in these Letters Patent and making part of the same.*

TO ALL WHOM IT MAY CONCERN:

Be it known that I, JOEL H. SOULE, of Georgetown, in the county of Madison, and State of New York, have invented a new and improved Milk-Stirrer; and I do hereby declare that the following is a full, clear, and exact description thereof, which will enable those skilled in the art to make and use the same, reference being had to the accompanying drawings, forming part of this specification, in which—

Figure 1 is a side view of my improved machine, part being broken away to show the construction.

Figure 2 is a perspective view of the stirrer.

Figure 3 is a detail sectional view of a modification of the bucket.

Similar letters of reference indicate corresponding parts.

My invention has for its object to furnish an improved self-acting machine, by means of which milk may be stirred, in cheese-factories and elsewhere, to keep the cream from rising during the night, or while said milk is standing; and it consists in the combination and arrangement of the various parts of the machine, as hereinafter more fully described.

A is a beam, pivoted at its middle part directly over the milk-vat. B is a weight, suspended from one end of the beam A. C is a bucket, suspended from the other end of the beam A, and which shall be of such a size that it, when empty, may be raised up or overbalanced by the weight B. To one side of the bucket C is attached an arm, D, which is connected with some fixed support, as E, by a chain, F, or its equivalent, in such a way that when the bucket C has descended the proper distance, it will be overturned, and its contents discharged, allowing the bucket to be again raised by the weight. G is a spring-catch, attached to some suitable support, in such a position that it may catch upon the said weighted end of the beam A, and hold it until enough water has run into the bucket C to overcome the force of the said spring-catch G. To the middle part of the beam A is attached a downwardly-projecting arm, H, the lower end of which enters a slot in the stirrer I, so that the said stirrer may be moved back and forth by the vibration of the beam A. The stirrer I consists of a longitudinal bar, $i^1$, to which are attached cross-bars, $i^2$. $i^3$ are pins, attached to and projecting from the bars $i^1$ and $i^2$, as shown in figs. 1 and 2. The bars $i^1$ and $i^2$ of the stirrer I may be solidly framed together, or they may be put together with joints, so that they may be taken apart if desired, in order to be more conveniently washed.

In using the machine, the stirrer I is thrown into the vat upon the top of the milk, and connected to the arm H. The waste water that flows around the vat, or a small stream of water from some other convenient source, is allowed to flow into the bucket C. As soon as a sufficient amount has flown in to overbalance the weight B, and overcome the force of the spring-catch G, the bucket C descends, until it is tipped up by the stop-chain F, and the water discharged. The weight B then raises the empty bucket C, to be again filled. The weight B, spring-catch G, and the size of the stream of water, may be so regulated as to operate the stirrer I as often as may be deemed necessary. The balancing-weight B may, if desired, be replaced by a bucket, and the stirrer moved in both directions by the descent of a full bucket, a spring-catch, G, being attached to each end of the beam A. The form of the bucket C is wholly immaterial, and, if desired, it may have a valve, $c'$, formed in its bottom, as shown in fig. 3, and connected with some fixed support by a chain, F, or its equivalent, so that, as the said bucket descends to a certain point, the said valve may be opened, and the water allowed to escape. By this construction and arrangement, the machine may be so adjusted as to move the stirrer as often or as seldom as may be desired.

I claim as new, and desire to secure by Letters Patent—

1. The stirrer I, constructed as described, resting upon the milk to be stirred, and operated by means of the arm H, from the beam A, having the weight B and bucket C, said stirrer being allowed to rise and fall with the milk in the vat, as herein shown and described.

2. The combination of one or more buckets C and stop-chain or chains F, or their equivalents, with the pivoted beam A, substantially as herein shown and described, and for the purpose set forth.

3. The combination of one or more spring-catches G with the end or ends of the pivoted beam A, substantially as herein shown and described, and for the purpose set forth.

JOEL H. SOULE.

Witnesses:
W. B. JACKSON,
J. W. NORTHROP.